US010920622B2

(12) United States Patent
Mansikkasalo (10) Patent No.: US 10,920,622 B2
(45) Date of Patent: Feb. 16, 2021

(54) METHOD AND A SYSTEM FOR RECOVERING THERMAL ENERGY IN A SYSTEM COMPRISING A CHEMICAL RECOVERY BOILER AND A LIME KILN

(71) Applicant: Valmet Technologies Oy, Espoo (FI)

(72) Inventor: Jarmo Mansikkasalo, Pirkkala (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 16/760,606

(22) PCT Filed: Nov. 30, 2018

(86) PCT No.: PCT/FI2018/050870
§ 371 (c)(1),
(2) Date: Apr. 30, 2020

(87) PCT Pub. No.: WO2019/115863
PCT Pub. Date: Jun. 20, 2019

(65) Prior Publication Data
US 2020/0378278 A1    Dec. 3, 2020

(30) Foreign Application Priority Data

Dec. 13, 2017    (FI) ..................................... 20176111

(51) Int. Cl.
| | | |
|---|---|---|
| *F01K 11/02* | (2006.01) | |
| *F01N 5/02* | (2006.01) | |
| *H02K 7/18* | (2006.01) | |

(52) U.S. Cl.
CPC ................ *F01K 11/02* (2013.01); *F01N 5/02* (2013.01); *H02K 7/1823* (2013.01)

(58) Field of Classification Search
CPC .......... F01K 11/02; F01N 5/02; H02K 7/1823
See application file for complete search history.

(56) References Cited

U.S. PATENT DOCUMENTS

| 5,469,699 A | 11/1995 | Daman |
| 5,765,365 A | 6/1998 | Fujioka et al. |

(Continued)

FOREIGN PATENT DOCUMENTS

| CN | 102261852 B | 2/2013 |
| EP | 1146021 A1 | 10/2001 |

(Continued)

OTHER PUBLICATIONS

Finnish Search Report for Finnish Patent Application No. 20176111, dated Jul. 6, 2018, (2 pages), Finnish Patent and Registration Office, Finland.

(Continued)

*Primary Examiner* — Shafiq Mian
(74) *Attorney, Agent, or Firm* — Alston & Bird LLP (57) ABSTRACT

Disclosed is a system for producing electricity, the system comprising a chemical recovery boiler adapted to supply superheated steam to a steam turbine driving a generator, the chemical recovery boiler comprising a first flue discharge channel with a first heat exchanger arrangement; and a lime kiln comprising a second flue discharge channel with a second heat exchanger arrangement; and a circulation for heat transfer medium between the said heat exchanger arrangements. Also disclosed is a method for producing electricity, wherein said heat transfer medium is circulated between said heat exchanger arrangements such that thermal energy may be transferred from the flue gases in the first flue charge channel and/or the second flue discharge channel into the feed water of the chemical recovery boiler and/or into a heat-consuming process.

13 Claims, 6 Drawing Sheets

(56) References Cited

U.S. PATENT DOCUMENTS

| | | | |
|---|---|---|---|
| 6,601,541 B2* | 8/2003 | Burdis et al. | F23J 15/02 |
| | | | 122/7 R |
| 2010/0126434 A1* | 5/2010 | Squire | F23J 15/02 |
| | | | 122/7 R |

FOREIGN PATENT DOCUMENTS

| | | |
|---|---|---|
| EP | 2434051 A1 | 3/2012 |
| JP | 2010-089980 A | 4/2010 |
| WO | WO-2002/097243 A1 | 12/2002 |
| WO | WO-2011/084212 A1 | 7/2011 |
| WO | WO-2012/042107 A2 | 4/2012 |
| WO | WO-2012/175796 A1 | 12/2012 |

OTHER PUBLICATIONS

International Searching Authority, International Search Report and Written Opinion for International Application No. PCT/FI2018/050870, dated Mar. 4, 2019, (13 pages), European Patent Office, The Netherlands.

* cited by examiner

METHOD AND A SYSTEM FOR RECOVERING THERMAL ENERGY IN A SYSTEM COMPRISING A CHEMICAL RECOVERY BOILER AND A LIME KILN

CROSS REFERENCE TO RELATED APPLICATIONS

This application is a National Stage Application, filed under 35 U.S.C. § 371, of International Application No. PCT/FI2018/050870, filed Nov. 30, 2018, which claims priority to Finnish Application No. 20176111, filed Dec. 13, 2017; the contents of both of which as are hereby incorporated by reference in their entireties.

BACKGROUND

Related Field

The solution relates electricity generation systems comprising a chemical recovery boiler and a lime kiln, and particularly to thermal energy recovery in such systems.

DESCRIPTION OF RELATED ART

In pulp manufacturing, chemical recovery boilers are employed to recover chemicals from the manufacturing process to be reused in the pulp manufacturing process. The process in the chemical recovery boiler generates heat which is typically used to produce superheated steam which is converted into electricity with steam turbine(s). In addition, from such a process comprising a chemical recovery boiler and a steam turbine, thermal energy may be recovered to be used for useful purposes within the process and outside it.

Sometimes a lime kiln is operated in the vicinity of the above-mentioned process. A lime kiln is typically used for calcinating limestone into quick lime. In other words, a lime kiln typically is employed to convert calcium carbonate at a high temperature such as 900-1000° C. into calcium oxide. With such use, a lime kiln can be employed for chemical regeneration in the pulp-making process, since the smelt yielded by a chemical recovery boiler may be treated in a dissolving process with calcium oxide, which process yields calcium carbonate.

Thermal energy recovered from the steam/water circulation of a chemical recovery boiler may be used in heat-consuming processes in a system comprising the chemical recovery boiler.

As an example of this, water fed to the chemical recovery boiler for evaporation and super-heating may be pre-heated before it is fed to the boiler. Typically, this is brought about by using low pressure steam such as steam bled off from the steam turbine for pre-heating feed water with a heat exchanger arrangement.

To provide another example, there may be a hydrothermal carbonization (HTC) process arranged in conjunction with the pulp manufacturing process. In such a HTC process, lignin yielded by the pulping process may be used as a raw material to produce bio carbon which may be used, e.g., as a substitute for oil-based raw materials. The lignin slurry fed to such a HTC process may be pre-heated with thermal energy recovered from the steam/water circulation of a chemical recovery boiler. As the lignin slurry must typically be pre-heated into 220-230° C., final pre-heating of the slurry is typically brought about by using low pressure steam such as steam bled off from the steam turbine for pre-heating feed water with a heat exchanger arrangement.

In both such example applications, and in comparable applications, there is a disadvantage in that the low-pressure steam such as steam bled off from the steam turbine reduces the electricity yield at the steam turbine. This is because a proportion of thermal energy that could be used in electricity generation with the steam turbine is extracted from the steam and used elsewhere in the process, such as in feed water pre-heating and/or lignin slurry pre-heating. Herein and subsequently, low-pressure steam refers to bleed steam bled off from a steam turbine, the pressure of which bleed steam is lower than the pressure of the steam fed to the steam turbine.

The purpose of the present solution is to alleviate such disadvantages and thereby increase the electricity yield at the steam turbine while simultaneously improving the thermal efficiency of the system.

BRIEF SUMMARY

The system according to the disclosed solution comprises as major system elements a chemical recovery boiler, a lime kiln and a steam turbine. The method according to the disclosed solution is applicable in such a system.

In a system according to the disclosed solution, there may be two flue gas discharge channels: a first flue gas discharge channel in conjunction with the chemical recovery boiler and a second flue gas discharge channel in conjunction with the lime kiln.

According to the disclosed solution, both flue gas discharge channels may comprise a heat exchanger arrangement adapted to recover thermal energy from flue gases.

According to the disclosed solution, there may be a circulation of heat transfer medium arranged such that at least some of the heat transfer medium conveyed through the heat exchanger arrangement in the first flue gas discharge channel may be conveyed to the heat exchanger arrangement in the second flue gas discharge channel, wherein heat may be transferred from the flue gases in the second flue gas discharge channel into the heat transfer medium.

According to the disclosed solution, the heat transfer medium may be employed after the heat exchanger arrangement in the second flue gas discharge channel by way of releasing thermal energy to a heat-consuming process.

As an example, such a heat-consuming process may be heating the feed water of the chemical recovery boiler. With such heating of the feed water, there is no need or there is a reduced need for using more valuable low-pressure steam from the steam turbine for the purposes of heating feed water. Thus, the efficiency of electricity production with the steam turbine may be increased and/or said more valuable low-pressure steam may be employed for other more pertinent purposes than heating feed water. In addition, the energy efficiency of the process comprising the lime kiln may be increased because thermal energy can be recovered from the flue gases of the lime kiln and be used for productive purposes. With the disclosed solution, the electricity yield of the steam turbine can be increased by way of providing the feed water of the chemical recovery boiler with additional thermal energy originating from the flue gases of the lime kiln.

As another example, such a heat-consuming process may be a process external to the operation of the chemical recovery boiler. Such a heat-consuming process external to the operation of the chemical recovery boiler may be, for example, the heating of lignin slurry to be fed into a hydrothermal carbonization (HTC) process, which may be arranged in conjunction with pulp manufacturing process.

With such release of thermal energy to the heat-consuming process, there is no need or is a reduced need for using more valuable low-pressure steam from the steam turbine for the purposes of the heat-consuming process. Thus, the efficiency of electricity production with the steam turbine may be increased and/or said more valuable low-pressure steam may be employed for other more pertinent purposes than the heat-consuming process.

In addition, the energy efficiency of the process comprising the lime kiln may be increased because thermal energy can be recovered from the flue gases of the lime kiln and be used for productive purposes.

A system according to the disclosed solution may comprise a chemical recovery boiler adapted to supply superheated steam to a steam turbine driving a generator, which generator may be an electric generator adapted to produce electricity. In such a system, the chemical recovery boiler may comprise a first flue gas discharge channel adapted to discharge the flue gases of the chemical recovery boiler, and a first heat exchanger arrangement arranged in the first flue gas discharge channel and adapted to recover thermal energy from the flue gases of the chemical recovery boiler. Such a system may further comprise a lime kiln adapted to oxidize calcium carbonate ($CaCO_3$) of lime mud to produce lime (CaO), the lime kiln comprising a second flue gas discharge channel adapted to discharge the flue gases of the lime kiln, and a second heat exchanger arrangement arranged in the second flue gas channel and adapted to recover thermal energy from the flue gases of the lime kiln. Such a system may further comprise a circulation for heat transfer medium, the circulation comprising the first heat exchanger arrangement, the second heat exchanger arrangement, and a pipeline adapted to convey at least some of the heat transfer medium between the first heat exchanger arrangement and the second heat exchanger arrangement.

A method according to the disclosed solution may comprise supplying superheated steam with a chemical recovery boiler to a steam turbine driving a generator, the chemical recovery boiler comprising a first flue gas discharge channel adapted to discharge the flue gases of the chemical recovery boiler and a first heat exchanger arrangement arranged in the first flue gas discharge channel and adapted to recover thermal energy from the flue gases of the chemical recovery boiler. Such a method may further comprise oxidizing calcium carbonate ($CaCO_3$) of lime mud to produce lime (CaO) with a lime kiln, the lime kiln comprising a second flue gas discharge channel adapted to discharge the flue gases of the lime kiln, and a second heat exchanger arrangement arranged in the second flue gas channel and adapted to recover thermal energy from the flue gases of the lime kiln. Such a method may further comprise circulating heat transfer medium in a heat transfer medium circulation, the circulation comprising the first heat exchanger arrangement, the second heat exchanger arrangement, and a pipeline adapted to convey at least some of the heat transfer medium between the first heat exchanger arrangement and the second heat exchanger arrangement.

BRIEF DESCRIPTION OF THE VARIOUS FIGURES

The figures are intended for illustrating the idea of the disclosed solution. Therefore, the figures are not in scale or suggestive of a definite layout of system components.

DETAILED DESCRIPTION OF VARIOUS EMBODIMENTS

In the text, reference is made to the figures with the following numerals:
1 Chemical recovery boiler
2 Lime kiln
3 Steam turbine
4 Generator
5 Electricity-consuming process
6 Feed water tank
7 First flue gas discharge channel
8 Second flue discharge channel
10 to 13 Pump
20 to 35 Heat exchanger
40 to 93 Line
100 to 103 Flash tank
110 to 113 Ejector pump
120 to 123 Electrostatic precipitator
130 to 131 Valve arrangement
140 Driveline
150 to 156 Heat-consuming process In the text and in the figures, the notion of a "line" is used to refer to any suitable conveyance passageway without any definite characterization of the physical properties of the passageway. It is to be appreciated that a person skilled in the art is capable of determining the physical properties of a passageway according to the properties and the volume of the material to be conveyed as well as other such pertinent conveyance parameters and requirements.

Below, the notion of a "pipeline" is used to refer to an assemblage of lines adapted to convey certain material.

Below, the notion of "downstream" is used to refer to a position with respect to the direction of prevailing movement such as flow of a material in a line or a pipeline.

The system according to the disclosed solution comprises as major system elements, as illustrated in FIGS. 1 through 4 according to examples, a chemical recovery boiler 1, a lime kiln 2 and a steam turbine 3. The method according to the disclosed solution is applicable in such a system.

The lime kiln 2 may be employed for calcinating limestone into quick lime, i.e. to convert calcium carbonate into calcium oxide. With such use, the lime kiln 2 may be used for chemical regeneration in the pulp-making process, since the smelt yielded by a chemical recovery boiler may be treated in a dissolving process with calcium oxide, which process yields calcium carbonate. Such calcination in a kiln 2 typically takes place at a high temperature such as 900-1000° C.

In a system according to the disclosed solution, as illustrated in FIGS. 1 through 4 according to examples, the chemical recovery boiler 1 supplies superheated steam to the steam turbine 3, which drives an electric generator 4 via a suitable driveline 140. The electric generator 4 thusly driven supplies electricity via a line 41 to an electricity-consuming process 5 such as a local, residential, regional or a national electric grid.

In a system where the disclosed solution is applicable, for example as illustrated in FIGS. 1 through 4 according to examples, the chemical recovery boiler 1 may generate superheated steam by taking water in via a line 51, and heating, vaporizing and superheating the water with suitable heat exchangers such as a heat exchanger 29 and a heat exchanger 30 connected via a line 52. In industry parlance, the heat exchanger 29 may be referred to as an economizer or a set of individual economizer devices, and the heat exchanger 30 may be referred to as a superheater or a set of individual superheater devices. The superheated steam may be conveyed to the steam turbine 3 via a line 40. It is to be appreciated that such heating, vaporizing and superheating water with a recovery boiler 1 is well known in the industry.

It is to be appreciated that a person skilled in the art knows various feasible implementations for the feed water line 51, for which reason such line 51 is schematically denoted in FIGS. 1 through 4 with a dashed line.

In a system where the disclosed solution is applicable, for example as illustrated in FIGS. 1 through 4 according to examples, after the steam turbine 3, steam and/or water—depending on its pressure—may be returned for re-use. Water for eventual re-use may be collected in a collecting reservoir such as a feed water tank 6.

Figure 1:
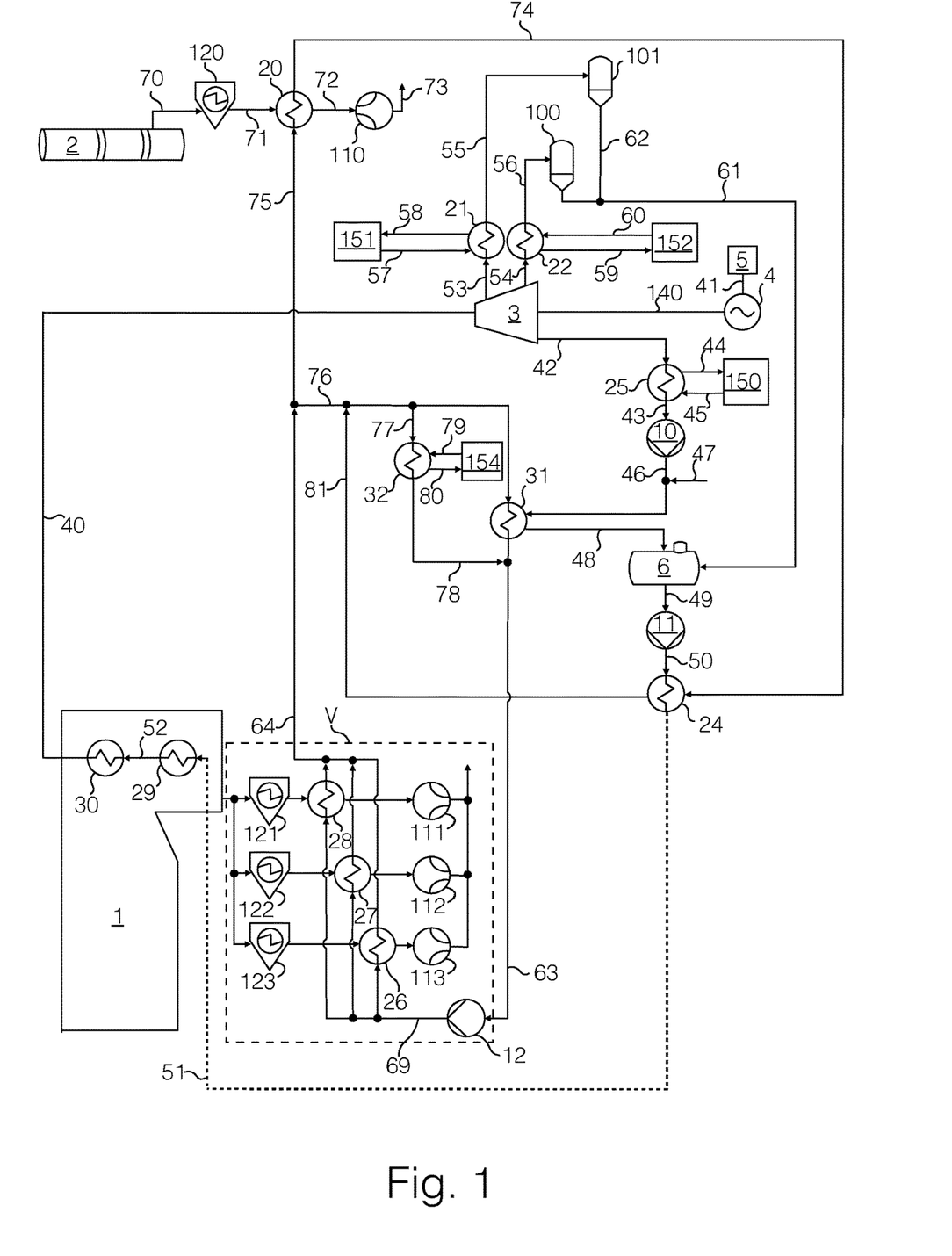
FIG. 1 schematically illustrates a system according to the disclosed solution according to an example.
Figure 2:
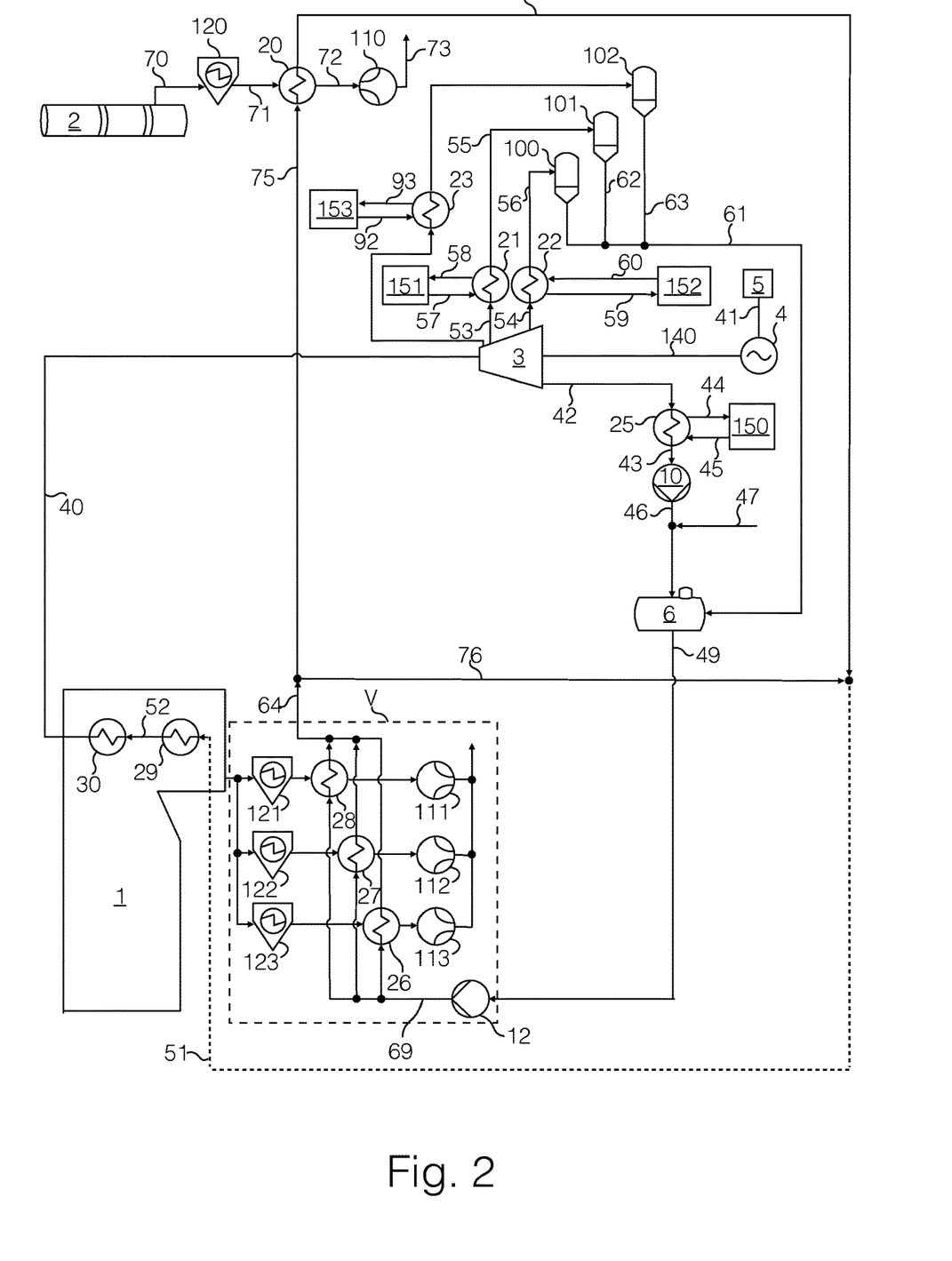
FIG. 2 schematically illustrates a system according to the disclosed solution according to an example.

In a system where the disclosed solution is applicable, for example as illustrated in FIGS. 1 through 4 according to examples, thermal energy may be recovered from steam/water which is returning from the steam turbine 3 before it reaches a collecting reservoir. For example, as illustrated in FIGS. 1 and 2 according to examples, thermal energy may be recovered from returning steam with heat exchangers 21, 22 and/or 23 followed by flashing tanks 101, 100 and/or 102, respectively, which flash tanks may be connected via lines 62, 61 and/or 63, respectively, to the feed water tank 6. The thermal energy recovered with heat exchangers 21, 22 and/or 23 may be released to be used in heat-consuming process(es) 151, 152 and/or 153, respectively. Such heat-consuming process(es) 151, 152 and/or 153 may be connected to the heat exchanger(s) 21, 22 and/or 23, respectively, via separate circulation(s) of heat transfer medium via lines 57 and 58, 59 and 60, and/or 92 and 93, respectively. Such heat-consuming process(es) 151, 152 and/or 153 may be, for example at a pulp mill a fiber line, a pulp-drying machine, and/or an evaporation and power boiler, and/or at an integrated pulp and paper mill various paper-making processes, and/or processes related to the operation of the chemical recovery boiler 1 such as intake air heating, feed water heating and/or soot blowing. Alternatively, or in addition, as illustrated in FIG. 1 according to an example, thermal energy may be recovered with a heat exchanger 25 from water returning from the steam turbine 3 via a line 42. The thermal energy recovered with the heat exchanger 25 may be released to be used in a heat-consuming process 150 which may be a heat sink such as river, lake or sea water, or a cooling tower. Such a heat-consuming process 150 may be connected to the heat exchanger 25 via a separate circulation of heat transfer medium via lines 45 and 45. After the heat exchanger 25, the returning water may be conveyed to the collecting reservoir via a passageway commencing with a line 43 and terminating at the collecting reservoir such as the feed water tank 6. In such a passageway, there may be a flow-inducing device such as a pump 10. Additional water may be fed to such a passageway, such as via a line 47, which may be connected to said passageway for example immediately downstream from said flow-inducing device.

In a system according to the disclosed solution, as illustrated in FIGS. 1 through 4 according to examples, there may be two flue gas discharge channels: a first flue gas discharge channel 7 in conjunction with the chemical recovery boiler 1 and a second flue gas discharge channel 8 in conjunction with the lime kiln 2. That is, the chemical recovery boiler 1 may comprise the first flue gas discharge channel 7, and the lime kiln 2 may comprise the second flue gas discharge channel 8.

According to the disclosed solution, both flue gas discharge channels 7, 8 may comprise a heat exchanger arrangement adapted to recover thermal energy from flue gases.

Figure 6A:
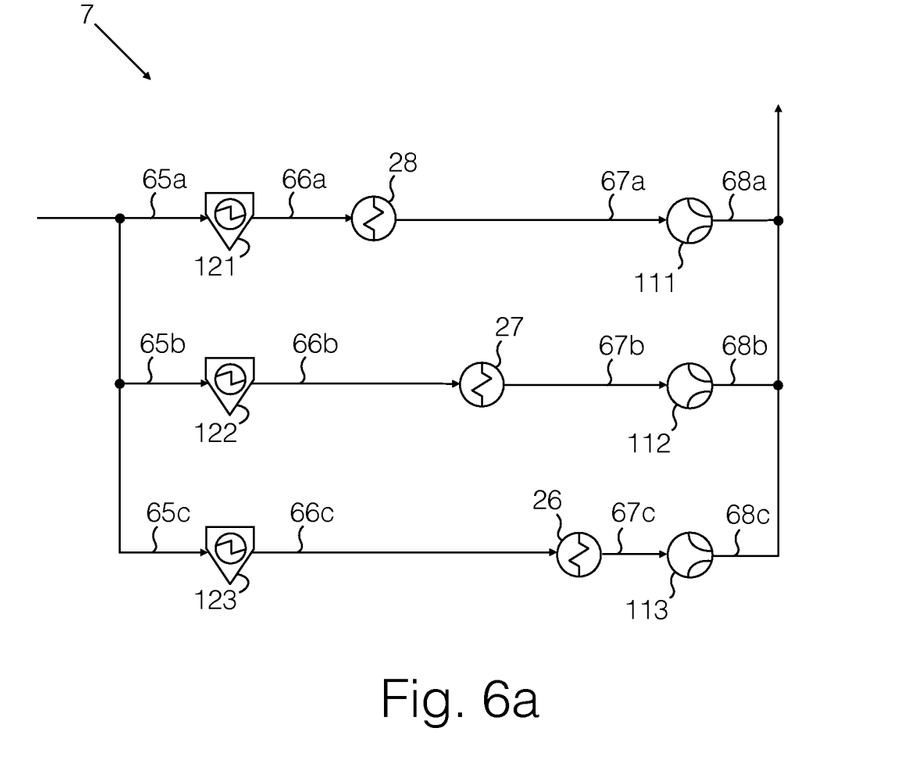
FIG. 6a schematically illustrates a first flue gas discharge channel according to an example.
Figure 6B:
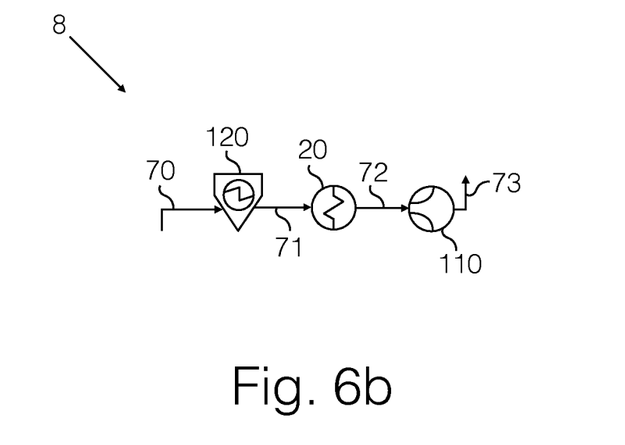
FIG. 6b schematically illustrates a second flue gas discharge channel according to an example.

For illustrative clarity, the first flue gas discharge channel 7 is illustrated in FIG. 6a according to an example, and the second flue gas discharge channel 8 is illustrated in FIG. 6b according to an example.

According to the disclosed solution, there may be a circulation of heat transfer medium arranged such that at least some of the heat transfer medium conveyed through the heat exchanger arrangement in the first flue gas discharge channel 7 may be conveyed to the heat exchanger arrangement in the second flue discharge channel, 8 wherein heat may be transferred from the flue gases in the second flue gas discharge channel 8 into the heat transfer medium. For example, 5-10% or 10-20% or 20-30% or 30-40% or 40-50% or 50-60% or 60-70% or 70-80% or 80-90% or 90-100% of volumetric flow of the heat transfer medium conveyed through the heat exchanger arrangement in the first flue gas discharge channel 7 may be conveyed through the heat exchanger arrangement in the second flue discharge channel 8.

Figure 3:
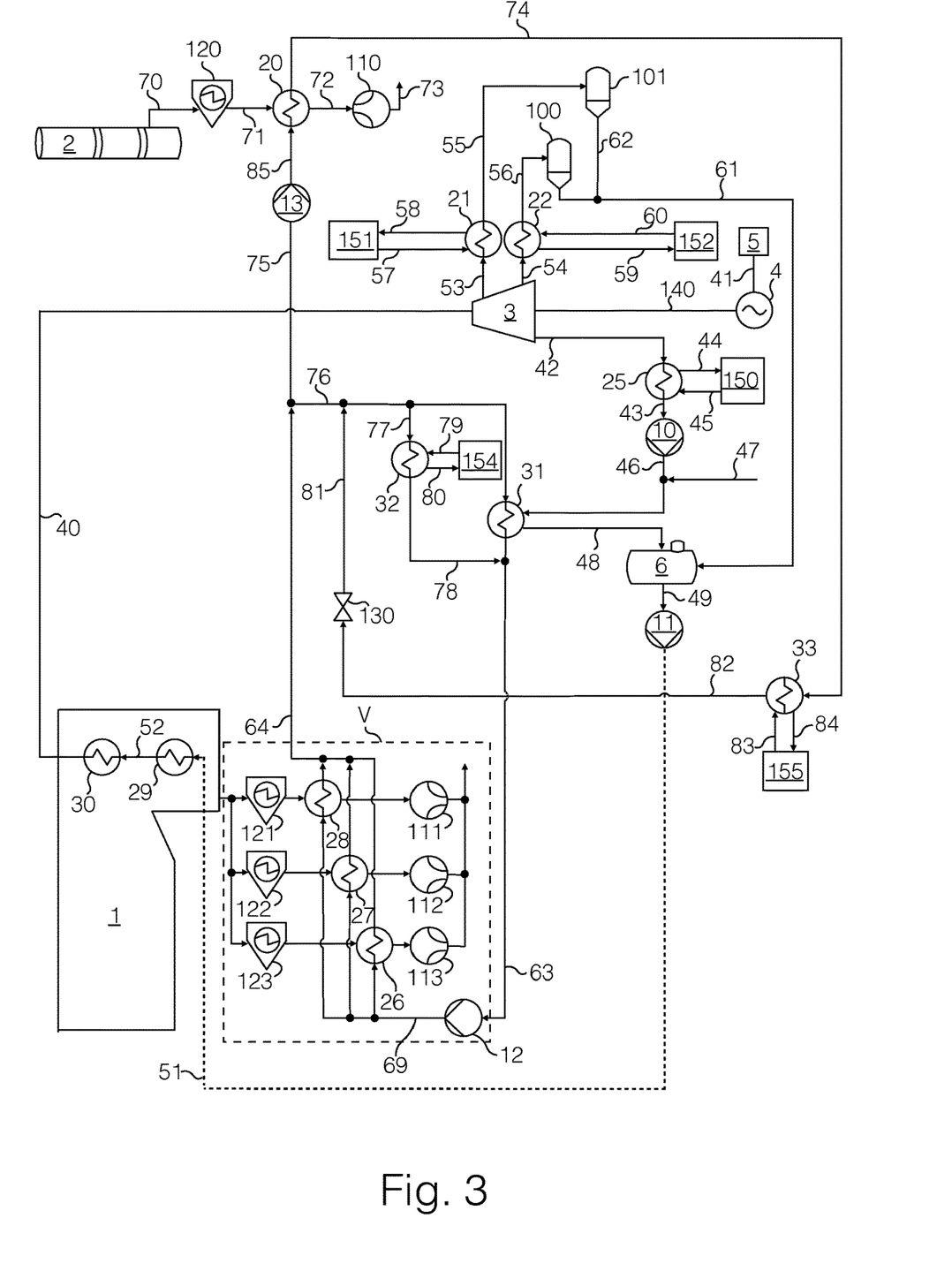
FIG. 3 schematically illustrates a system according to the disclosed solution according to an example.
Figure 4:
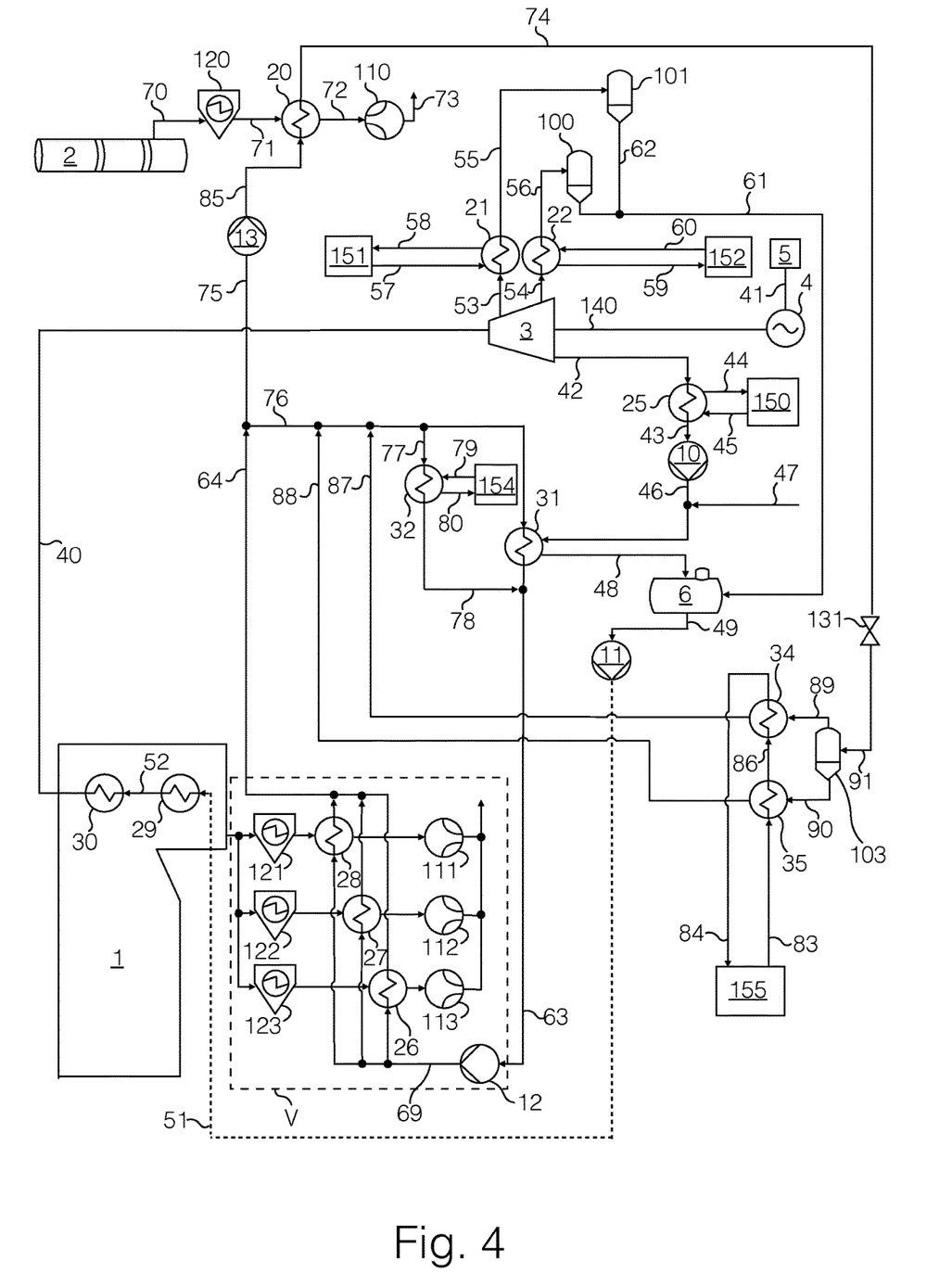
FIG. 4 schematically illustrates a system according to the disclosed solution according to an example.

According to the disclosed solution, the heat transfer medium may be employed after the heat exchanger arrangement in the second flue gas discharge channel 8 by way of releasing thermal energy to a heat-consuming process. As an example, such a heat-consuming process may be heating the feed water of the chemical recovery boiler 1, as is illustrated in FIGS. 1 and 2 according to examples. As another example, such a heat-consuming process may be a process external to the operation of the chemical recovery boiler 1, as is illustrated in FIGS. 3 and 4 as a heat-consuming process 155. Such a heat-consuming process 155 external to the operation of the chemical recovery boiler may be, for example, the heating of lignin slurry to be fed into a hydrothermal carbonization (HTC) process (not depicted), which may be arranged in conjunction with pulp manufacturing process.

The first flue discharge channel 7 in conjunction with the chemical recovery boiler 1 may be arranged to convey flue gases from the chemical recovery boiler 1 to outside the focal process depicted, such as to a stack (not depicted).

The first flue gas discharge channel 7 may comprise a filtering arrangement for filtering out particulate matter from the flue gases before the flue gases are conveyed to a heat exchanger arrangement. Such filtering arrangement may comprise, for example, one or more electrostatic precipitators 121, 122, 123.

The first flue gas discharge channel 7 may comprise a flow-inducing arrangement to effect the discharge travel of the flue gases after the heat exchanger arrangement. Such flow-inducing arrangement may comprise, for example, one or more ejector pumps 111, 112, 113. Such ejector pumps 111, 112, 113 may be, for example, vacuum pumps. In the industry, such ejector pumps 111, 112, 113 may be referred to as flue gas fans.

Figure 5:
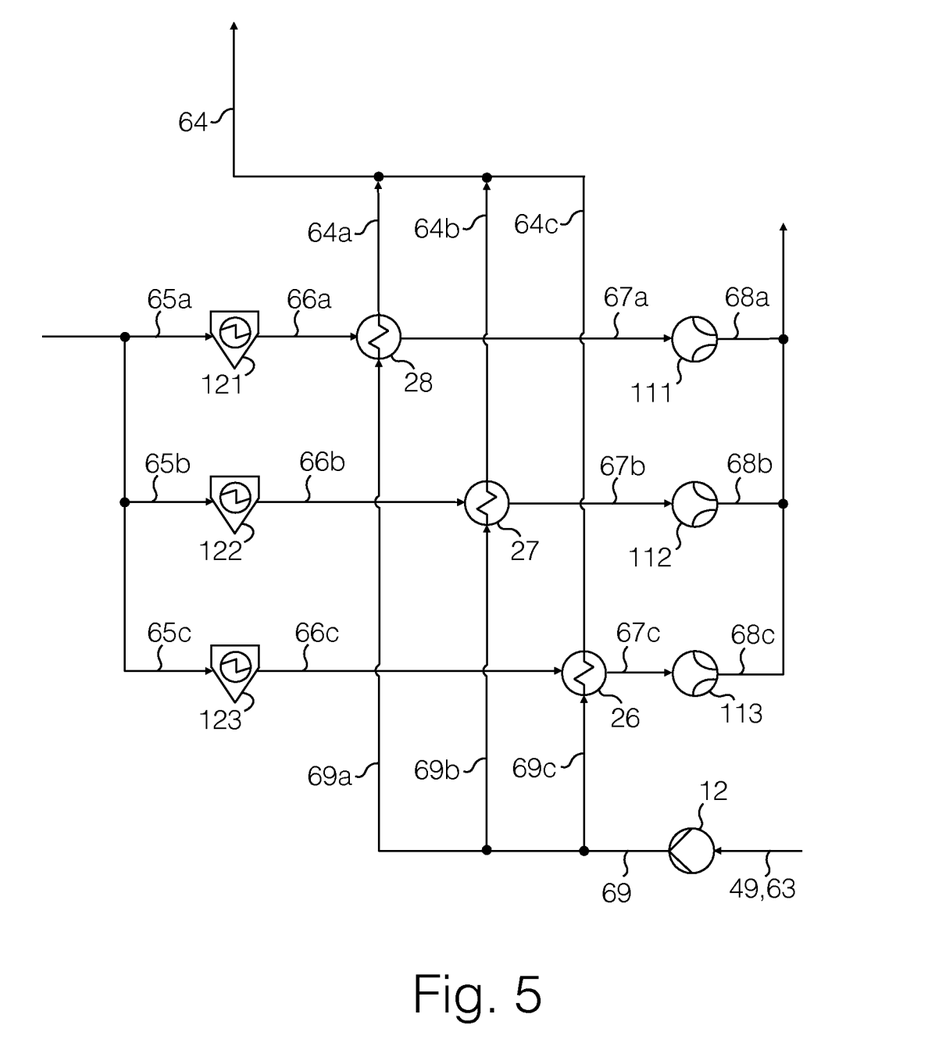
FIG. 5 schematically illustrates a first flue gas discharge channel together with a pipeline adapted to convey heat transfer medium through a heat exchanger arrangement therein according to an example.

For illustrative clarity, the first flue gas discharge channel 7 together with a pipeline adapted to convey heat transfer medium through a heat exchanger arrangement therein are illustrated according to an example in FIG. 5. Consistently with this example, the first flue gas discharge channel 7 may be divided into several sub-channels, such as three sub-channels as in the case of the specific example illustrated in FIG. 5. Therein, the first sub-channel may comprise lines 65a, 66a, 67a and 68a; the second sub-channel may comprise lines 65b, 66b, 67b and 68b; and the third sub-channel may comprise lines 65c, 66c, 67c and 68c. Therein, flue gases from the chemical recovery boiler 1 may be conveyed via lines 65a-c to electrostatic precipitators 121, 122, 123, and from there via lines 66a-c to heat exchangers 28, 27, 26, and from there via lines 67a-c and ejector pumps 111, 112, 113 to be expelled via lines 68a-c, correspondingly. In this case, in the first flue gas discharge channel 7, thermal energy may be transferred with the heat exchangers 28, 27, 26 into the heat transfer medium travelling into the heat exchangers 28, 27, 26 via lines 69a-c and out from the heat exchangers 28, 27, 26 via lines 64a-c, respectively.

The second flue discharge channel 8 in conjunction with the lime kiln 2 may be arranged to convey flue gases from the lime kiln 2 to outside the focal process depicted, such as to a stack (not depicted).

As illustrated in FIGS. 1 through 4 according to examples, the second flue discharge channel 8 may comprise a filtering arrangement for filtering out particulate matter from the flue gases before the flue gases are conveyed to the heat exchanger arrangement. Such a filtering arrangement may comprise, for example, one or more electrostatic precipitators 120. The second flue gas discharge channel 8 may comprise a flow-inducing arrangement to effect the discharge travel of the flue gases after the heat exchanger arrangement. Such a flow-inducing arrangement may comprise, for example, one or more ejector pumps 110. Such ejector pump(s) 110 may be, for example, vacuum pump(s).

As illustrated in FIGS. 1 through 4 according to examples, the second flue gas discharge channel 8 may be arranged so that flue gases are conveyed from the lime kiln 2 via a line 70 to an electrostatic precipitator 120 and from there via a line 71 to a heat exchanger 20, and from there via a line 72 and an ejector pump 110 to be expelled via a line 73. In the second flue gas discharge channel 8, thermal energy may be transferred with the heat exchanger 20 into the heat transfer medium travelling through heat exchanger 20.

According to the disclosed solution, there may be a pipeline adapted to convey at least some of the heat transfer medium between the first heat exchanger arrangement 7 and the second heat exchanger arrangement 8, such as from the first heat exchanger arrangement 7 to the second heat exchanger arrangement 8 or vice versa. Such a pipeline may comprise at least lines 64 and 75, such as lines 64 and 74, or lines 64, 74 and 85.

According to the disclosed solution, the feature that at least some of the heat transfer medium conveyed through the heat exchanger arrangement in the first flue gas discharge channel 7 may be conveyed to the heat exchanger arrangement in the second flue gas discharge channel 8 may be brought about so that the heat transfer medium conveyed from the first heat exchanger arrangement via the line 64 may be apportioned into two streams. Such two streams may comprise a first stream conveyed to the heat exchanger or exchangers 20 in the second flue gas discharge channel 8, and a second stream conveyed elsewhere via a line 76. That is, the line 76 may branch off from the circulation of the heat transfer medium between the first heat exchanger arrangement and the second heat exchanger arrangement. The first stream may account, for example, 5-10% or 10-20% or 20-30% or 30-40% or 40-50% or 50-60% or 60-70% or 70-80% or 80-90% or 90-100% of the volumetric flow of the heat transfer medium in the line 64 before apportioning into the first and second streams.

According to the disclosed solution, thermal energy transferred into the heat transfer medium of the first stream in the second flue gas discharge channel 8 in conjunction with the lime kiln 2, such as with the heat exchanger 20, may be subsequently released to be employed in a heat-consuming process. Such a heat-consuming process may be, for example, heating of the feed water of the chemical recovery boiler 1. As another example, such a heat-consuming process may be the heating of lignin slurry to be fed into a hydrothermal carbonization (HTC) process (not depicted), which may be arranged in conjunction with pulp manufacturing process.

The use of the thermal energy transferred into the heat transfer medium of the first stream in the second flue gas discharge channel 8 for heating the feed water of the chemical recovery boiler 1 may be brought about, for example, in accordance with an example illustrated in FIG. 1. In this case, after the heat exchanger or exchangers 20 in the second flue gas discharge channel 8, said heat transfer medium may be conveyed via a line 74 to another heat exchanger 24, below referred to as also as a "primary heat exchanger" 24 for referential distinguishing purposes. With the heat exchanger 24, thermal energy may be released from said heat transfer medium into the feed water of the chemical recovery boiler 1, thereby heating the feed water. Such heating of feed water may be brought about after the feed water has exited the feed water tank 6.

Advantageously, with such heating of the feed water, there is no need or there is a reduced need for using more valuable low-pressure steam from the steam turbine 3 for the purposes of heating feed water. Thus, the efficiency of electricity production with the steam turbine 3 may be increased and/or said more valuable low-pressure steam may be employed for other more pertinent purposes than heating feed water. In addition, the energy efficiency of the process comprising the lime kiln 2 may be increased because thermal energy can be recovered from the flue gases of the lime kiln 2 and be used for productive purposes.

Still referring to FIG. 1, after said heat exchanger 24, said heat transfer medium may be conveyed via a line 81 to a line 76, via which line 76 the second stream of heat transfer medium is conveyed, as apportioned from the line 64 originating at the first flue gas discharge channel 7 heat exchanger(s) 26, 27, 28. Thus, at the point in which the line 81 connects to the line 76, the first and second stream of the heat transfer medium become combined. After such combining, the heat transfer medium may be apportioned once again, into a third stream into a line 77 and a fourth stream continuing in line 76. The mutual proportions of the heat transfer medium in the third stream and in the fourth stream may be specified in accordance with desired proportional heat energy transfer to and recovery in a heat exchanger 32 (the third stream) and a heat exchanger 31 (the fourth stream), as described immediately below. As illustrated in FIG. 1, the third stream may be conveyed via the heat exchanger 32 for releasing thermal energy to be employed in a heat-consuming process 154 such as the heating of intake air of the chemical recovery boiler 1. Such a heat-consuming process 154 may be connected to the heat exchanger 32 via a separate circulation of heat transfer medium via lines 79 and 80. The fourth stream may be conveyed to another heat exchanger 31 for releasing thermal energy to water returning from the steam turbine before said returning water reaches a feed water tank 6. Below, the heat exchanger 31 and the heat exchanger 32 are also referred to as the "tertiary heat exchanger" 31 and the "tertiary heat exchanger" 32 for referential distinguishing purposes.

Still referring to FIG. 1, after the heat exchanger 31, the third stream and the fourth stream of the heat transfer medium may be combined at a locus where a line 78 originating at the heat exchanger 32 connects to the line 63 originating at the heat exchanger 31. Thereafter, the combined flow of heat transfer medium may be conveyed via a circulation-inducing pump 12, followed by a line 69, to the first flue gas discharge channel 7 heat exchanger(s) 26, 27, 28 for re-heating.

Still referring to FIG. 1, certain conditions obtaining according to a specific example may be as follows. Of the volumetric flow of the heat transfer medium in the line 64, approximately 10% may be apportioned as the first stream into the line 75 and approximately 90% may be apportioned as the second stream into the line 76. In this case, the pressure prevailing in said lines may be approximately 25 bar and the temperature approximately 150° C. The temperature of the flue gases in the second flue gas discharge channel 8 may be approximately 260° C. before the heat exchanger 20 and approximately 170° C. after the heat exchanger 20. The temperature of the heat transfer medium in line 74 after the heat exchanger 20 may be approximately 200° C. When heating the feed water with the heat exchanger 24, the temperature of the feed water before the heat exchanger 24 may be approximately 143° C. and after it approximately 147° C. Correspondingly, the temperature of the heat transfer medium in the first stream may be approximately 200° C. before the heat exchanger 24 and approximately 150° C. after it.

To provide another example, the use of the thermal energy transferred into the heat transfer medium in the first stream in the second flue gas discharge channel 8 for heating the feed water of the chemical recovery boiler 1 may be brought about, for example, in accordance with an example illustrated in FIG. 2. In this case, the said transfer medium may be the feed water of the chemical recovery boiler 1. Herein, after the feed water tank 6, the feed water may be conveyed via a line 49 to the first flue gas discharge channel 7 heat exchanger(s) 26, 27, 28, wherein thermal energy may be transferred into the feed water, thereby heating it. After this, the feed water may be conveyed via a line 64 to a locus of apportioning, wherein feed water is apportioned into a first stream into a line 75 and a second stream into a line 76. Of these two streams, the first stream may be conveyed via the line 75 to the heat exchanger or exchangers in the second flue gas discharge channel 8, wherein thermal energy may be transferred from the flue gases originating from the lime kiln 2 into the feed water, thereby heating the feed water in the first stream. Thereafter, the feed water of the first stream may be conveyed via a line 74 to a locus in which the first stream in the line 74 and the second stream in the line 76 are combined. This combined flow of feed water may then be conveyed to the chemical recovery boiler 1 via a line 51.

Advantageously, with such heating of the feed water, there is no need or is a reduced need for using more valuable low-pressure steam from the steam turbine 3 for the purposes of heating feed water. Thus, the efficiency of electricity production with the steam turbine 3 may be increased and/or said more valuable low-pressure steam may be employed for other more pertinent purposes than heating feed water. In addition, the energy efficiency of the process comprising the lime kiln 2 may be increased because thermal energy can be recovered from the flue gases of the lime kiln 2 and be used for productive purposes.

Thus, in this example as illustrated in FIG. 2, there are no separate or substantially separate circuits for feed water and for heat transfer medium, but instead there is one such circuit for heat transfer medium which is feed water.

Still referring to FIG. 2, certain conditions obtaining according to a specific example may be as follows. Of the volumetric flow of the heat transfer medium in the line 64, approximately 10% may be apportioned as the first stream into the line 75 and approximately 90% may be apportioned as the second stream into the line 76. In this case, the pressure prevailing in said lines may be approximately 120 bar and the temperature approximately 160° C. The temperature of the flue gases in the second flue gas discharge channel 8 may be approximately 260° C. before the heat exchanger 20 and approximately 180° C. after the heat exchanger 20. The temperature of the heat transfer medium in line 74 after the heat exchanger 20 may be approximately 175° C. Once the first stream of the heat transfer medium in line 76 and the second stream of the heat transfer medium in line 74 have been combined, the temperature of the combined feed water in line 51 may be approximately 163° C.

The use of the thermal energy transferred into the heat transfer medium of the first stream in the second flue gas discharge channel 8 in a heat-consuming process 155 may be brought about, for example, in accordance with an example illustrated in FIG. 3. Such a heat-consuming process 155 may be, for example, the heating of lignin slurry to be fed into a hydrothermal carbonization (HTC) process (not depicted).

In such a case, as illustrated in FIG. 3, before conveying the heat transfer medium of the first stream to the heat exchanger or exchangers 20 in the second flue gas discharge channel 8, it may be conveyed through a pump 13 installed in between lines 75 and 85, which pump 13 may be used to increase the pressure of the heat transfer medium to an elevated pressure. Such an elevated pressure may be, for example, 30-80 bar, such as 50 bar. By raising the pressure of the heat transfer medium to an elevated pressure, the temperature of the heat transfer medium may increase to a high temperature at the heat exchanger 20 without boiling of the heat transfer medium. Such a high temperature may be, for example, 200-290° C., such as 240° C.

Still referring to FIG. 3, after the heat exchanger 20 in the second flue gas discharge channel 8, the heat transfer medium of the first stream may be conveyed via a line 74 to another heat exchanger 33. Below, such another heat exchanger 33 is also referred to as the "secondary heat exchanger" for referential distinguishing purposes. With the heat exchanger 33 thermal energy may be released from said heat transfer medium to be used in the heat-consuming process 155. Such a heat-consuming process 155 may be connected to the heat exchanger 33 via a separate circulation of heat transfer medium via lines 83 and 84. Alternatively, such a heat-consuming process 155 may be connected to the heat exchanger 33 via a separate circulation of a substance to be heated via lines 83 and 84. For example, if the heat-consuming process 155 is the heating of lignin slurry to be fed into a HTC process, the lines 83 and 84 may convey lignin slurry through the heat exchanger 33, thereby enabling the heating of the lignin slurry.

Advantageously, with such release of thermal energy to the heat-consuming process 155, there is no need or is a reduced need for using more valuable low-pressure steam from the steam turbine 3 for the purposes of the heat-consuming process. Thus, the efficiency of electricity production with the steam turbine 3 may be increased and/or said more valuable low-pressure steam may be employed for other more pertinent purposes than the heat-consuming process 155. In addition, the energy efficiency of the process comprising the lime kiln 2 may be increased because thermal energy can be recovered from the flue gases of the lime kiln 2 and be used for productive purposes.

After the heat exchanger 33, the heat transfer medium of the first stream may be conveyed via a line 82 to a valve arrangement 130 with which the pressure of the heat transfer medium may be lowered to a level prevailing in line 76, which level may be, for example, 10-40 bar, such as bar. After the valve arrangement 130, the heat transfer medium in the first stream may be conveyed via a line 81 to a locus in which the first stream of the heat transfer medium and the second stream of the heat transfer medium become combined, i.e. in which the line 81 connects to the line 76.

After such combining, the heat transfer medium may be apportioned once again, into a third stream into a line 77 and into a fourth stream continuing in line 76. The mutual proportions of the heat transfer medium in the third stream and in the fourth stream may be specified in accordance with desired proportional heat energy transfer to and recovery in a heat exchanger 32 (the third stream) and a heat exchanger 31 (the fourth stream), as described immediately below. As illustrated in FIG. 3, the third stream may be conveyed via a heat exchanger 32 for releasing thermal energy to be employed in a heat-consuming process 154 such as the heating of intake air of the chemical recovery boiler 1. Such a heat-consuming process 154 may be connected to the heat exchanger 32 via a separate circulation of heat transfer medium via lines 79 and 80. The fourth stream may be conveyed to another heat exchanger 31 for releasing thermal energy to water returning from the steam turbine 3 before said returning water reaches a feed water tank 6.

Still referring to FIG. 3, after the heat exchangers 31, 32, the third stream and the fourth stream of the heat transfer medium may be combined at a locus where a line 78 originating at the heat exchanger 32 connects to the line 63 originating at the heat exchanger 31. Thereafter, the combined flow of heat transfer medium may be conveyed via a circulation-inducing pump 12 followed by a line 69 to the first flue gas discharge channel 7 heat exchanger(s) 26, 27, 28 for re-heating.

Still referring to FIG. 3, certain conditions obtaining according to a specific example may be as follows. Of the volumetric flow of the heat transfer medium in the line 64, approximately 10% may be apportioned as the first stream into the line 75 and approximately 90% may be apportioned as the second stream into the line 76. In this case, the pressure prevailing in said lines may be approximately 25 bar and the temperature approximately 180° C. After the pump 13, the pressure in the line 85 may be approximately 50 bar. The temperature of the flue gases in the second flue gas discharge channel 8 may be approximately 260° C. before the heat exchanger 20 and approximately 200° C. after the heat exchanger 20. The temperature of the heat transfer medium in line 74 after the heat exchanger 20 may be approximately 240° C. In this specific example, the heat-consuming process 155 may be the heating of lignin slurry for a HTC process, and lignin slurry may be conveyed through the heat exchanger 33 via lines 83 and 84. Consequently, the temperature of said slurry may be approximately 170° C. before heating with thermal energy captured with the heat exchanger 33, and approximately 213° C. after such heating. The pressure of the heat transfer medium in the line 81 after the valve arrangement 130 may be 25 bar.

To provide another example, the use of the thermal energy transferred into the heat transfer medium of the first stream in the second flue gas discharge channel 8 in a heat-consuming process 155 may be brought about, for example, in accordance with an example illustrated in FIG. 4. Such another heat-consuming process 155 may be, for example, the heating of lignin slurry to be fed into a hydrothermal carbonization (HTC) process (not depicted).

In such a case, as illustrated in FIG. 4, before conveying said heat transfer medium to the heat exchanger or exchangers 20 in the second flue gas discharge channel 8, it may be conveyed through a pump 13 installed in between lines 75 and 85, which pump 13 may be used to increase the pressure of the heat transfer medium to an elevated pressure. Such an elevated pressure may be, for example, 30-80 bar, such as 50 bar. By raising the pressure of the heat transfer medium to an elevated pressure, the temperature of the heat transfer medium may increase to a high temperature at the heat exchanger 20 without boiling of the heat transfer medium. Such a high temperature may be, for example, 200-290° C., such as 240° C.

Still referring to FIG. 4, after the heat exchanger 20 in the second flue gas discharge channel 8, the heat transfer medium of the first stream may be conveyed via a line 74 to a valve arrangement 131 with which the pressure of the heat transfer medium in the first stream may be lowered for the purposes of generating flash steam into a flash tank 103 which may be connected immediately downstream from the valve arrangement 131 with a line 91. From the flash tank 103, the heat transfer medium in a gaseous state may be conveyed to a heat exchanger 34 and the heat transfer medium in a liquid state may be conveyed to another heat exchanger 35. Below, the heat exchanger 34 and the heat exchanger 35 are also referred to as the "secondary heat exchanger" 34 and the "secondary heat exchanger" 35 for referential distinguishing purposes. With such heat exchangers 34, 35, thermal energy may be transferred from the heat transfer medium to be used in the heat-consuming process 155. Such a heat-consuming process 155 may be connected to the heat exchangers 34, 35 via a separate circulation of heat transfer medium via lines 83 and 84 plus a line 86 conveying said heat transfer medium from the heat exchanger 35 to the heat exchanger 34. Alternatively, such a heat-consuming process 155 may be connected to the heat exchangers 34, 35 via a separate circulation of a substance to be heated via lines 83 and 84 plus a line 86 conveying said substance from the heat exchanger 35 to the heat exchanger 34. For example, if the heat-consuming process 155 is the heating of lignin slurry to be fed into a HTC process, the lines 83, 84, 86 may convey lignin slurry through the heat exchangers 34, 35, thereby enabling the heating of the lignin slurry.

Advantageously, with such release of thermal energy from the heat transfer medium of the first stream to the heat-consuming process 155, there is no need or is a reduced need for using more valuable low-pressure steam from the steam turbine 3 for the purposes of the heat-consuming process 155. Thus, the efficiency of electricity production with the steam turbine 3 may be increased and/or said more valuable low-pressure steam may be employed for other more pertinent purposes than the heat-consuming process 155. In addition, the energy efficiency of the process comprising the lime kiln 2 may be increased because thermal energy can be recovered from the flue gases of the lime kiln 2 and be used for productive purposes.

After the heat exchangers 34, 35, and as illustrated in FIG. 4, the heat transfer medium may be conveyed via lines 87 and 88, respectively, to such loci where the first stream of the heat transfer medium and the second stream of the heat transfer medium become combined, i.e. in which the lines 87 and 88 connect to the line 76.

Still referring to FIG. 4, after such combining, the heat transfer medium may be apportioned once again, into a third stream into a line 77 and a fourth stream continuing in line 76. The mutual proportions of the heat transfer medium in the third stream and in the fourth stream may be specified in accordance with desired proportional heat energy transfer to and recovery in a heat exchanger 32 (the third stream) and a heat exchanger 31 (the fourth stream), as described immediately below. As illustrated in FIG. 4, the third stream may be conveyed via a heat exchanger 32 for releasing thermal energy to be employed in a heat-consuming process 154 such as the heating of intake air of the chemical recovery boiler 1. Such a heat-consuming process 154 may be connected to the heat exchanger 32 via a separate circulation of heat transfer medium via lines 79 and 80. The fourth stream may be conveyed to another heat exchanger 31 for releasing thermal energy to water returning from the steam turbine before said returning water reaches a feed water tank 6.

Still referring to FIG. 4, after the heat exchangers 31 and 32, the third stream and the fourth stream of the heat transfer medium may be combined at a locus where a line 78 originating at the heat exchanger 32 connects to the line 63 originating at the heat exchanger 31. Thereafter, the combined flow of heat transfer medium may be conveyed via a circulation-inducing pump 12 followed by a line 69 to the first flue gas discharge channel 7 heat exchanger(s) 26, 27, 28 for re-heating.

Still referring to FIG. 4, certain conditions obtaining according to a specific example may be as follows. Of the volumetric flow of the heat transfer medium in the line 64, approximately 10% may be apportioned as the first stream into the line 75 and approximately 90% may be apportioned as the second stream into the line 76. In this case, the pressure prevailing in said lines may be approximately 25 bar and the temperature approximately 180° C. After the pump 13, the pressure in the line 85 may be approximately 50 bar. The temperature of the flue gases in the second flue gas discharge channel 8 may be approximately 260° C. before the heat exchanger 20 and approximately 200° C. after the heat exchanger 20. The temperature of the heat transfer medium in line 74 after the heat exchanger 20 may be approximately 240° C. After the valve arrangement 131, the pressure of the heat transfer medium may be 25 bar. In this specific example, the heat-consuming process 155 may be the heating of lignin slurry for a HTC process, wherein the temperature of said slurry may be approximately 170° C. before heating with thermal energy captured with the heat exchangers 34 and 35, and approximately 213° C. after such heating.

The above-described examples are intended to explain the general idea of the disclosed solution. Therefore, such examples are not to be taken as exhausting the ways in which the general idea of the disclosed solution may be implemented.

The invention claimed is:

1. A system for producing electricity, the system comprising:

a chemical recovery boiler adapted to supply superheated steam to a steam turbine driving a generator, the chemical recovery boiler comprising:
        a first flue gas discharge channel adapted to discharge the flue gases of the chemical recovery boiler, and
        a first heat exchanger arrangement arranged in the first flue gas discharge channel and adapted to recover thermal energy from the flue gases of the chemical recovery boiler;
    a lime kiln adapted to oxidize calcium carbonate ($CaCO_3$) of lime mud to produce lime (CaO), the lime kiln comprising:
        a second flue gas discharge channel adapted to discharge the flue gases of the lime kiln, and
        a second heat exchanger arrangement arranged in the second flue gas channel and adapted to recover thermal energy from the flue gases of the lime kiln; and
    a circulation for heat transfer medium, the circulation comprising:
        the first heat exchanger arrangement,
        the second heat exchanger arrangement, and
        a pipeline adapted to convey at least some of the heat transfer medium between the first heat exchanger arrangement and the second heat exchanger arrangement.

2. The system according to claim 1, wherein the circulation for the heat transfer medium further comprises at least a primary heat exchanger downstream from the second heat exchanger arrangement and before the first heat exchanger arrangement, the primary heat exchanger adapted to transfer thermal energy from the heat transfer medium into the feed water of the chemical recovery boiler.

3. The system according to claim 1, wherein:
    the pipeline is configured to convey at least some of the heat transfer medium from the first heat exchanger arrangement to the second heat exchanger arrangement, and
    the circulation for the heat transfer medium further comprises one or more secondary heat exchangers, the one or more secondary heat exchangers arranged downstream from the second heat exchanger arrangement and before the first heat exchanger arrangement and adapted to transfer thermal energy from the heat transfer medium to a heat-consuming process.

4. The system according to claim 3, wherein the heat-consuming process comprises heating lignin slurry.

5. The system according to claim 1, comprising a feed water pump, wherein:
    the circulation for the heat transfer medium further comprises a superheater, the superheater adapted to produce superheated steam and arranged in a chemical recovery boiler, and
    the first heat exchanger arrangement and the second heat exchanger arrangement are arranged in the circulation for the heat transfer medium in between the feed water pump and the superheater.

6. The system according to claim 1, the system further comprising:
    a line branching off from the circulation for the heat transfer medium in between the first heat exchanger arrangement and the second heat exchanger arrangement, and
    at least a tertiary heat exchanger adapted to recover thermal energy from the line.

7. The system according to claim 6, wherein the tertiary heat exchanger is configured to transfer thermal energy into the feed water of the chemical recovery boiler, into the combustion air of the chemical recovery boiler and/or into another heat-consuming process.

8. The system according to claim 1, the system further comprising at least one of:
- a first filtering arrangement in the first flue gas discharge channel, the first filtering arrangement configured to clean flue gases and arranged in the flow direction of the flue gases before the first heat exchanger arrangement, or
- a second filtering arrangement in the second flue gas discharge channel, the second filtering arrangement configured to clean flue gases and arranged in the flow direction of the flue gases before the second heat exchanger arrangement.

9. A method for producing electricity, the method comprising:
- supplying superheated steam with a chemical recovery boiler to a steam turbine driving a generator, the chemical recovery boiler comprising:
  - a first flue gas discharge channel adapted to discharge the flue gases of the chemical recovery boiler, and
  - a first heat exchanger arrangement arranged in the first flue gas discharge channel and adapted to recover thermal energy from the flue gases of the chemical recovery boiler;
- oxidizing calcium carbonate ($CaCO_3$) of lime mud to produce lime (CaO) with a lime kiln, the lime kiln comprising:
  - a second flue gas discharge channel adapted to discharge the flue gases of the lime kiln, and
  - a second heat exchanger arrangement arranged in the second flue gas channel and adapted to recover thermal energy from the flue gases of the lime kiln; and
- circulating heat transfer medium in a heat transfer medium circulation, the circulation comprising:
  - the first heat exchanger arrangement,
  - the second heat exchanger arrangement, and
  - a pipeline adapted to convey at least some of the heat transfer medium between the first heat exchanger arrangement and the second heat exchanger arrangement.

10. The method according to claim 9, wherein:
the circulation for the heat transfer medium further comprises at least a primary heat exchanger downstream from the second heat exchanger arrangement and before the first heat exchanger arrangement, and
the method further comprises transferring thermal energy with the primary heat exchanger from the heat transfer medium into the feed water of the chemical recovery boiler.

11. The method according to claim 9, wherein:
the pipeline is configured to convey at least some of the heat transfer medium from the first heat exchanger arrangement to the second heat exchanger arrangement,
the circulation for the heat transfer medium further comprises one or more secondary heat exchangers, the one or more secondary heat exchangers arranged downstream from the second heat exchanger arrangement and before the first heat exchanger arrangement, and
the method further comprises transferring thermal energy with the one or more secondary heat exchangers from the heat transfer medium to a heat-consuming process.

12. The method according to claim 11, wherein the heat-consuming process comprises heating lignin slurry.

13. The method according to claim 9, further comprising a feed water pump, wherein:
the circulation for the heat transfer medium further comprises a superheater, the superheater adapted to produce superheated steam and arranged in a chemical recovery boiler, and
the first heat exchanger arrangement and the second heat exchanger arrangement are arranged in the circulation for the heat transfer medium in between the feed water pump and the superheater.

* * * * *